(12) United States Patent
Yu et al.

(10) Patent No.: US 6,850,910 B1
(45) Date of Patent: Feb. 1, 2005

(54) ACTIVE DATA HIDING FOR SECURE ELECTRONIC MEDIA DISTRIBUTION

(75) Inventors: Hong Heather Yu, Plainsboro, NJ (US); Alexander D. Gelman, Brooklyn, NY (US); Robert S. Fish, Gillette, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/425,592

(22) Filed: Oct. 22, 1999

(51) Int. Cl.[7] ............................................. G06F 17/60
(52) U.S. Cl. ............................. 705/51; 705/50; 705/53; 705/54; 705/57
(58) Field of Search ............................ 705/50, 51, 53, 705/54, 57, 1, 52, 58, 59

(56) References Cited

U.S. PATENT DOCUMENTS

| | | | |
|---|---|---|---|
| 5,687,236 A | * 11/1997 | Moskowitz et al. | 380/28 |
| 5,745,569 A | * 4/1998 | Moskowitz et al. | 380/4 |
| 5,748,783 A | 5/1998 | Rhoads | |
| 5,809,139 A | 9/1998 | Girod et al. | |
| 5,822,432 A | * 10/1998 | Moskowitz et al. | 380/28 |
| 5,848,155 A | 12/1998 | Cox | |
| 5,862,260 A | 1/1999 | Rhoads | |
| 5,893,067 A | 4/1999 | Bender et al. | |
| 5,905,800 A | 5/1999 | Moskowitz et al. | |
| 5,915,027 A | 6/1999 | Cox et al. | |
| 5,930,369 A | 7/1999 | Cox et al. | |
| 5,949,885 A | * 9/1999 | Leighton | 380/54 |
| 5,963,909 A | 10/1999 | Warren et al. | |
| 6,047,374 A | * 4/2000 | Barton | 713/150 |
| 6,311,214 B1 | * 10/2001 | Rhoads | 709/217 |
| 6,398,245 B1 | * 6/2002 | Gruse et al. | 280/228 |

FOREIGN PATENT DOCUMENTS

EP 840513 A2 * 5/1998 ............ H04N/7/24

OTHER PUBLICATIONS

CRL coding guards copyrighted images, Clarke, Peter, Electronic Engineering Times, n903, p42(1) May 27, 1996.*
Digital watermarking of audio signals using a psychoacoustic auditory model and spread spectrum theory–Ricardo Garcia, Apr 21, 1999, University of Miami School of Music.*
Bender et al., Techniques for Data Hiding, IBM Systems Journal, Feb. 1996, vol. 35, No. 3 & 4 (entire document).
Koch et al. Copyright Protection for Multimedia Data, ACM digital Library, Dec. 1984 (entire document).
Zhao, J., Applying Digital Watermarking Techniques to Online Multimedia Commerce, ACM Digital Library, CISSA 1997, Jun. 1997 (entire document).

* cited by examiner

*Primary Examiner*—James P. Trammell
*Assistant Examiner*—Calvin L Hewitt, II
(74) *Attorney, Agent, or Firm*—Harness, Dickey & Pierce, PLC

(57) ABSTRACT

A method is provided for distributing multimedia content in an electronic media distribution system. The method includes the steps of: (a) providing active hidden data, where the active hidden data includes a plurality of executable machine instructions; (b) embedding active hidden data into the host data stream, thereby forming an embedded data stream; (c) transmitting the embedded data stream from a content provider device to a player device; (d) extracting the active hidden data from the embedded data stream on the player device; and (e) executing the active hidden data on the player device.

4 Claims, 4 Drawing Sheets

ACTIVE DATA HIDING FOR SECURE ELECTRONIC MEDIA DISTRIBUTION

BACKGROUND AND SUMMARY OF THE INVENTION

The present invention relates generally to active data hiding, and more particularly, to method and system for robustly hiding active data into a host media data stream with errorless extractability.

Electronic media distribution imposes high demands on content protection mechanisms for secure distribution of media. Average users are starting to access and will soon be looking forward to purchasing multimedia content through the Internet. This urges the development of secure content distribution technologies with which content owners will agree to electronic distribution of digital media such as video and audio. The problem is amplified by the fact that the digital copy technology such as DVD-R, DVD-RW, CD-R, and CD-RW are widely available. Accordingly, imperceptible data hiding is becoming an attractive research area.

Previous research in the area of data hiding has been concentrated on passive data hiding, such as digital watermarking, for copyright protection or copy control. Passive data, as its name implies, can only be acted upon. In other words, passive data cannot actively perform a task. Key renewal or surveillance are two exemplary techniques for providing secure content distribution. In the case of passive data hiding, this type of functionality can only be achieved through additional functions built into the players. This greatly limits the application domain and the renewability of the system when additional functions are not available to the multimedia player devices.

Therefore, it is desirable to provide a method and system that can robustly hide active data into host media data stream with errorless extractability. Compared to conventional passive data hiding, active data hiding can improve renewability, controllability, and interoperability, provide additional application values and a higher level of security to electronic distribution of multimedia content.

For a more complete understanding of the invention, its objects and advantages refer to the following specification and to the accompanying drawings.

DETAILED DESCRIPTION OF THE PREFERRED EMBODIMENTS

Data hiding is generally defined as imposing a meaningful, imperceptible and extractable data stream onto a host signal. Imperceptibility and extractability are two technical criteria for conventional data hiding. Imperceptibility means that the embedded data needs to be hidden into the host data signal such that it will not interfere with the quality (e.g., visibility or audibility) of the host signal. In addition, the embedded data needs to be extractable from the host signal on a player device. The extracted hidden data can then be used for copy control, copyright protection and other purposes.

In accordance with the present invention, active data hiding is a technique for hiding an applet or some other executable file into a host data signal. In addition to the imperceptibility and extractability requirements, active data hiding bears additional technical requirements. First, the size of the active hidden data is usually at least several hundred bytes. Instead of low bit rate embedding as in the case of conventional passive data hiding, active data hiding requires high bit rate embedding. However, for a fixed size host signal, it is more difficult to hide additional hidden data into the host signal, and thus it is more difficult to satisfy the imperceptibility requirement.

Second, active data hiding requires blind detection capability for electronic media distribution applications. Since only the protected medium, is available to the playing device, the extraction of any hidden data has to be performed without the original host medium. Third, due to the sensitivity to errors in an executable file, the extracted active hidden data has to be virtually errorless, i.e., the embedding has to be lossless.

Figure 1:
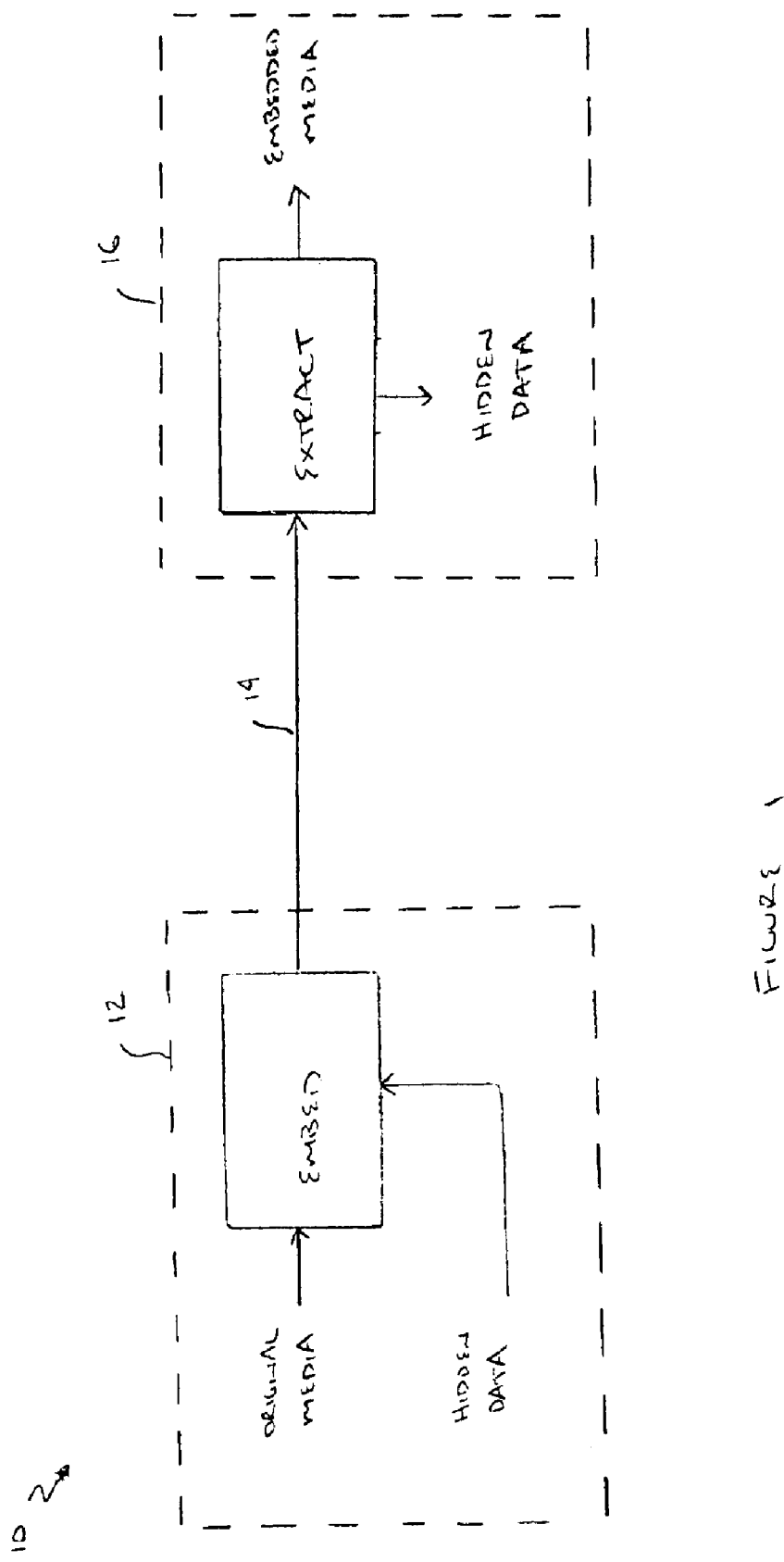
FIG. 1 is a block diagram depicting an electronic media distribution system in accordance with the present invention.

An electronic media distribution system 10 is depicted in FIG. 1. The media distribution system 10 includes a content provider device 12 that is connected via a distribution channel 14 to at least one player device 16. In operation, the original multimedia content is embedded with hidden data on the content provider device 12. The embedded media is then transmitted through the distribution channel 14 to the player device 16. At the player device 16, the embedded multimedia content may be played or used. In addition, the hidden data may be extracted from the embedded data signal.

Figure 2:
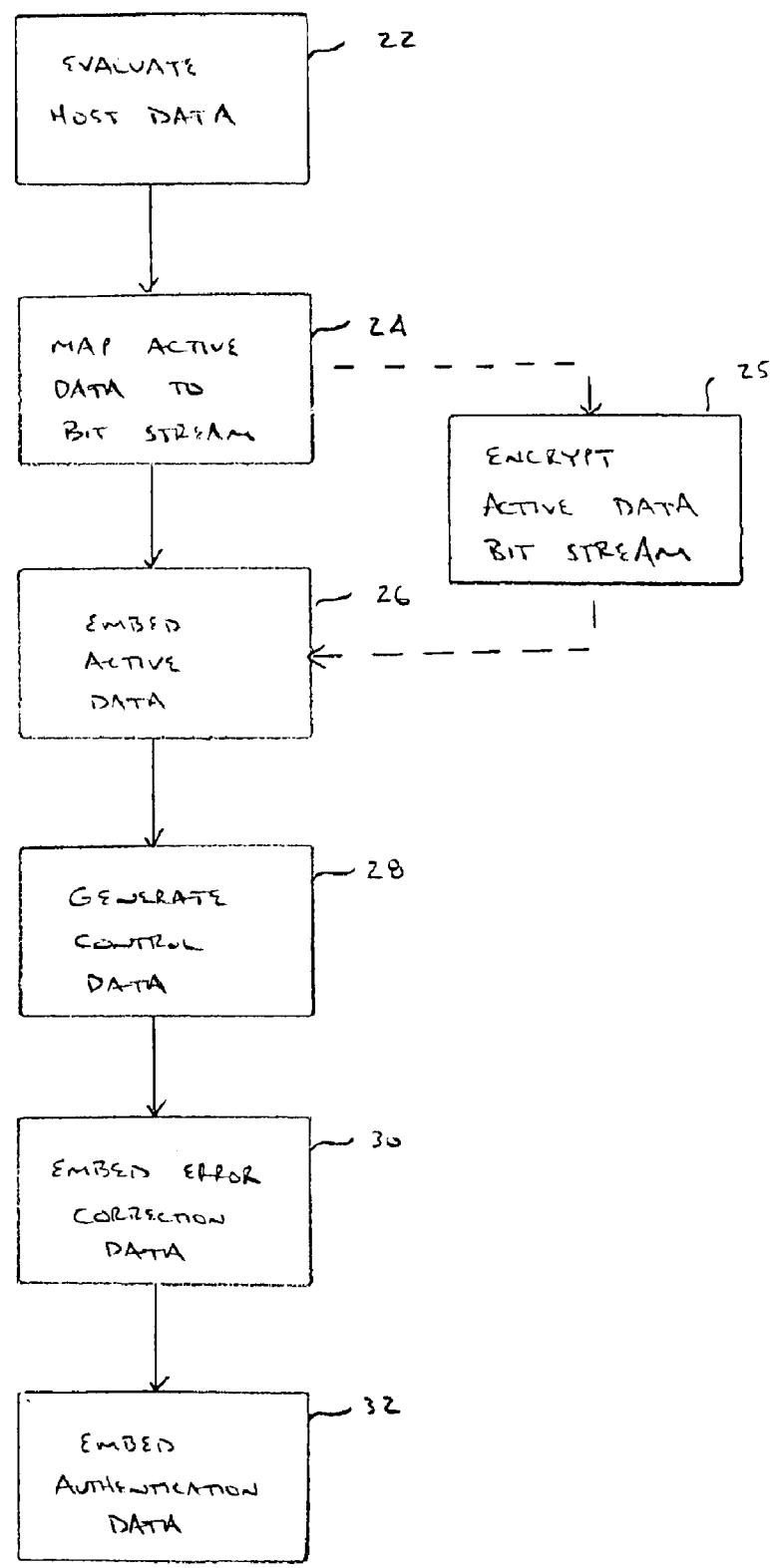
FIG. 2 is a flow diagram illustrating a method for hiding active data in accordance with the present invention.

In accordance with the present invention, a method for hiding active data in a host signal is shown in FIG. 2. The host data signal is defined as original multimedia content, such as a digital video or audio signal. A preferred embodiment of the method uses a three-pass architecture to hide active data into a host data signal.

First, the host data signal is evaluated 22 to determine the media units of the host data. For a digital video signal, the media unit is one or more frames of video data. The host data signal may be further evaluated to determine the type of features associated with each media unit. For instance, a frame of video data includes features such as objects, texture regions and background. This information is subsequently used to determine how to embed the hidden data into the host signal.

The host data signal is then embedded with active hidden data, thereby forming an embedded data signal. Active hidden data is defined as a set of executable machine instructions, such as a JAVA applet or some other executable file or program. In order to embed the active data, the active data stream is mapped 24 into a sequence of binary data. Although in the case of a JAVA applet the active data stream is mapped into a sequence of binary data, it some instances it may not be converted to binary data. The bit stream of binary data is then inserted 26 imperceptibly into the host signal. It is also envisioned that the bit stream may be scrambled prior to insertion into the host signal. Thus, the embedded data signal designates a modified version of the host data signal that has additional meaningful data embedded into it. Although the invention is not limited to a particular embedding scheme, base domain embedding and spectrum domain embedding are two exemplary embedding schemes.

The host data signal may also be embedded with hidden control data. Hidden control data is used to govern the use of the active hidden data. For example, hidden control data may include synchronization data, identification data, access control data, keys, management data, error correction data, authentication data or other types of control data. These various types of control data are useful in the proper extraction of the active data stream as well as to control proper usage of the active data stream and the host signal. As will be more fully explained below, hidden control data is particularly useful to ensure errorless extraction of the active hidden data from the embedded data signal.

An additional embedding step is needed for each type of hidden control data embedded into the host signal. For illustration purposes, two types of control data are embedded into the host data signal in FIG. 2: error correction data and authentication data. After generating the hidden control data in step 28, error correction data is first embedded 30 into the embedded data signal. Subsequently, authentication data can be embedded into the resulting data signal, thereby forming the embedded data signal that is to be transmitted to the player device.

Prior to being embedded into the host data signal, the active data stream may optionally be encrypted as shown at step 25. In this case, if the decryption key needs to be transmitted along with active data stream, the key may also be embedded in the control data.

Figure 3:
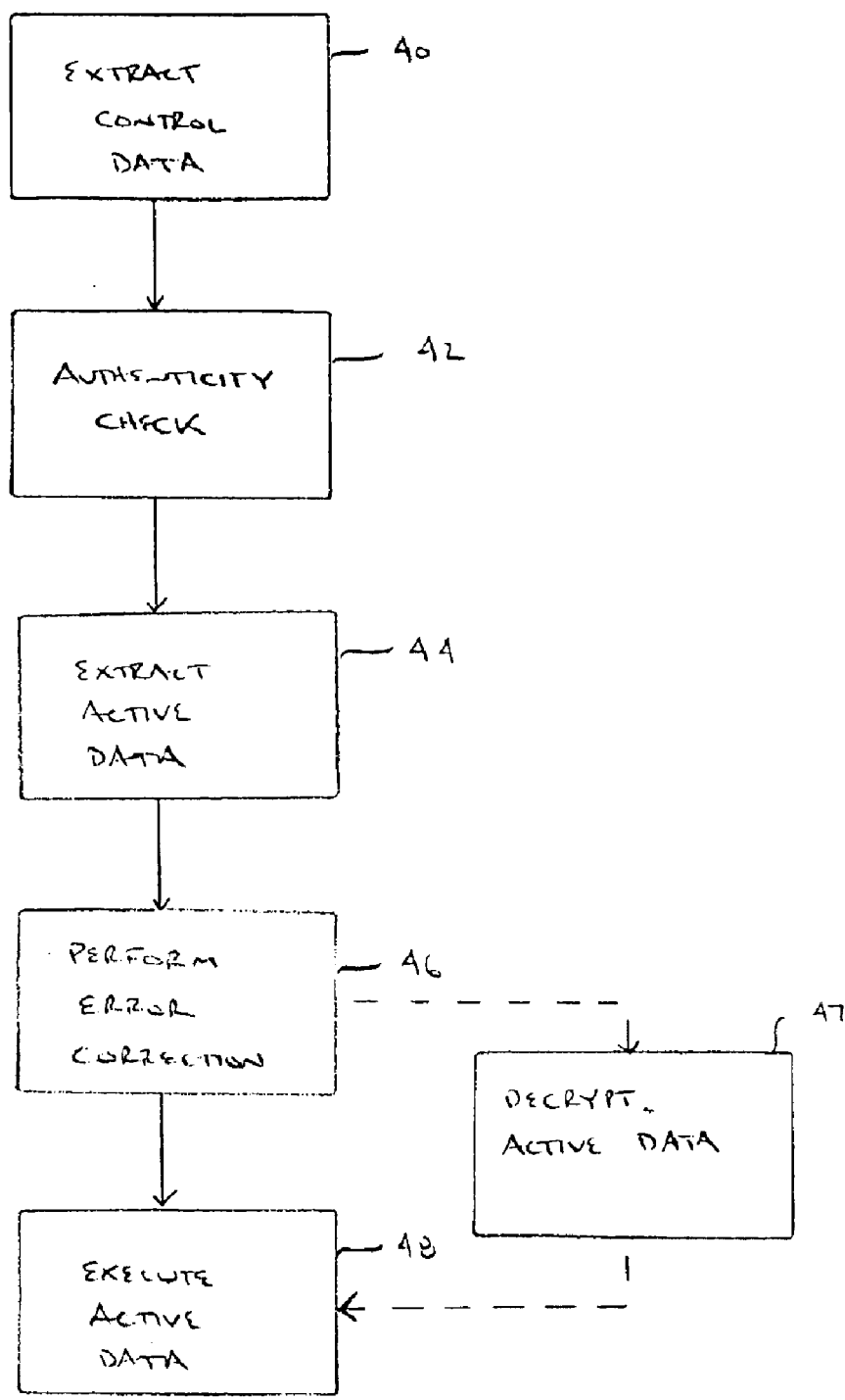
FIG. 3 is a flow diagram illustrating a method of decoding a host data signal embedded with an active data stream in accordance with the present invention.

Once the embedded data signal is received on the player device, a decoding process occurs as shown in FIG. 3. As will be apparent to one skilled in the art, corresponding decoding techniques are performed to extract the embedded data signal received by the player device.

In this case, the authentication data is first extracted 40 from the embedded data signal. An authentication check is performed 42 to verify the reliability of the data signal. The active hidden data can the be extracted 44 from the embedded data signal.

Error correction data facilitates the extraction process of the active hidden data. Due to the additional control data hidden in the data signal, the detector/extractor on the player device can determine if there are any errors in the extracted active hidden data, and if so can further correct the errors such that the active hidden data is executable on the player device. The error correction process is shown at step 46. In this way, the present invention ensures errorless extractability of the hidden data.

At this point, the active hidden data can be executed 48 on the player device. Again, the active data stream may optionally be decrypted 47 prior to being executed on the player device.

In contrast to conventional passive data hiding, active hidden data introduces new functionality for ensuring secure electronic media distribution. For instance, an active data stream can be configured to permit feedback of information back to the content provider. In this case, when streaming or online preview is performed over the distribution channel (e.g., the Internet) to the player device, the information is transmitted back to the content provider or the content distributor.

In other instances, the active data stream may be configured to allow a play-once-preview, to enable renew keys or other management rules, or to scramble the host signal to prevent further unauthorized use of the content. These functions may be performed with the assistance of the hidden control data. For example, if an identification check or access control check fails, the host signal may be scrambled to prevent unauthorized use; otherwise the active data stream may perform other tasks while allowing authorized playback/usage of the host signal.

Figure 4:
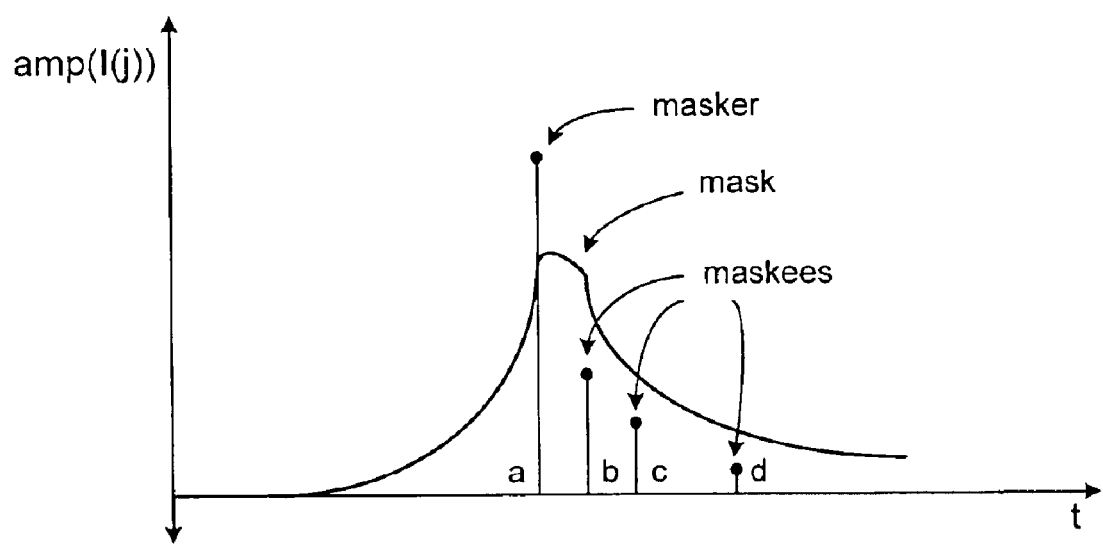
FIG. 4 is a diagram depicting a perceptual mask in accordance with the present invention.

A methodology for hiding active data in an audio signal is presented to further illustrate the principles of the present invention. In this case, a three-pass, multi-layer approach is used to embed active hidden data, error correction data and authentication data into an audio signal;

A first pass embeds the active hidden data into the host data signal. Proper usage of the perceptual model ensures the imperceptibility of the embedded hidden data. The perceptual model takes advantage of human auditory system's inability to distinguish noise under conditions of auditory masking. That is, the presence of a strong audio signal makes a temporal or spectral neighborhood of weaker and imperceptible audio signals. Empirical data shows that the human ear cannot distinguish the differences when a minor change is made on a singular point or maskee point (under the condition it is still a maskee point before and after the modification), where a singular point, masker point and maskee point are defined as follows:

a singular point $I(j)$ is defined as $(I(j))=-sign(I(j-1))$ & $sign(I(j))=-sign(I(j+1))$;

a masker point $I(j)$ is defined as a point with an intensity value larger than a threshold $\delta$, i.e., $amp(I(j)) \geq \delta$;

a maskee point $I(j^k)$ is defined as a point that is under the mask of a masker point $I(j)$, i.e., $amp(I(j^k)) \leq mask(amp(I(j)))$ To illustrate the above-described principle, a perceptual mask is graphically depicted in FIG. 4. In this figure, sample a is a masker point and samples b, c and d are maskee points. While the following description applies the perceptual model to an audio host signal, it is readily understood that the application of the perceptual model varies depending on the type of host data.

Furthermore, the application of the perceptual model also varies based on the particular embedding scheme being used to hide the active data. For instance, the masking ability of a given sample depends on its loudness in a base domain embedding scheme. In contrast, the masking ability of a given signal component depends on its frequency position and its loudness in the spectrum domain embedding scheme. Empirical results further show that the noise masking threshold at any given frequency is solely dependent on the signal energy within a limited bandwidth neighborhood of that frequency and at any given time is solely dependent on the signal energy within a limited temporal neighborhood. Accordingly, the base domain scheme has better decoding performance in terms of speed than the spectrum domain scheme; whereas the spectrum domain scheme has higher survivability over compression than the base domain scheme.

As will be apparent to one skilled in the art, several techniques can be used to embed bits into the singular and maskee points of the host audio signal. For illustration purposes, a simple encoding technique is provided for embedding a sequence of bits $Sb_1, Sb_2, \ldots Sb_M$ into the singular bits $Isng_1, Isng_2 \ldots Isng_M$, of a host signal $I_1, I_2, \ldots I_n \ldots I_N$. The encoding technique is as follows:

If $I(j)=0$, set $I(j)=I(j)+1$

If the embedding bit $Sb_m$ is 0 and the mth singular point is $Isng_m$, then set $Isng_1$ to 0.

If the embedding bit $Sb_m$ is 1, then leave $Isng_m$ unchanged or set $\epsilon_1 \leq Isng_m \leq \epsilon_2$, where $\epsilon_1$ and $\epsilon_2$ are lower and upper bound with $\epsilon_2$ controlled by perceptual mark.

To ensure maximum detectability, error correction data and authentication data should be embedded into different data layers within the host data signal. The active hidden data layer and any subsequent control data layers are preferably orthogonal to each other. The orthogonality of the embedded layers avoids any interference between embedded bits, thereby ensuring extractability of each layer. For example, singular points and maskee points are two orthogonal features of the host data signal which may be used to hide different data layer. Accordingly, active data may be hidden in the singular points and the control data in the maskee points of the host signal. Alternatively, if the signal is partitioned into subsets or subspaces, then the features extracted from the different subsets or subspaces will be orthogonal to each other. Thus, it is envisioned that other orthogonal aspects of the host data signal, such as other orthogonal features in the same domain (e.g., time, spectrum, etc.) or other features extracted from different orthogonal domains, may be used to embed the different layers. Although orthogonality is preferred, it should be noted that different data layers may also be non-orthogonal as far as the zero false rate is guaranteed for the extraction of the active data stream.

Next, error correction data is embedded into the host data signal. Again, the error correction data is hidden in a second orthogonal layer of the host signal. For illustration purposes, a 2D checksum error correction technique is being used to embed error correction data. Assume the error correction bit number is Q and the active data stream bit number is M. Thus, the error correction stream length (number of bits) satisfies $M=(Q/2)^2$ for the 2D checksum technique. For example, an active data stream having a length of 4000 bits requires only $64 \times 2 \approx 128$ error correction bits in the case of 2D checksum. An exemplary 2D checksum technique is provided as follows:

Let Q=ceiling[$2M^{1/2}$], i.e., let Q be the smallest integer which is no less than $2M^{1/2}$.

Arrange $Sb=Sb_1, Sb_2, \ldots Sb_M$ into Q/2 chucks $SB(1)=SB(1)_1, SB(1)_2, \ldots SB(1)_{Q/2}=Sb_1, Sb_2, \ldots Sb_{Q/2}$, $SB(2)=SB(2)_1, SB(2)_2, \ldots SB(2)_{Q/2+1}, \ldots Sb_Q \ldots$ and $SB(Q/2)=SB(Q/2)_1, SB(Q/2)_2, \ldots SB(Q/2)_{Q/2} = Sb_{(QQ-2Q)/4+1}, \ldots Sb_M$ Let $E_q = LSB(SB(q)_1 + SB(q)_2 + \ldots + SB(q)_{Q/2})$ for $q \in (1, Q/2)$ and $E_q = LSB(SB(1)_q + SB(2)_q + \ldots + SB(Q/2)_q)$ for $q \in (Q/2, Q)$, where LSB(S) denotes the least significant bit of S.

While the above-described example employs a 2D checksum error correction technique, it is readily understood that other error correction techniques are within the scope of the present invention, including but not limited to Perfect codes, Quasi-perfect code, Hamming code, Duel codes, Hadamard codes, Golay codes, Nordstrom-Robinson codes, BCH codes, Cyclic codes, MDS codes, Reed-Muller codes, Kerdock codes, Preparata codes, Quadratic-residue codes, Reed-Solomon codes, and Justesen codes.

Lastly, authentication data is embedded into the host data signal. Again, the authentication data is placed into a third orthogonal layer of the host signal. In this case, a preferred authentication scheme places the authentication value into the least significant bit of each sample of the host audio signal. To ensure orthogonality, $\epsilon_1$ shall be set to 2 or larger for both singular point and maskee point embedding of the authentication data. A overview of the authentication algorithm is as follows:

Choose verification block size B and dependent block size D (for example, B=128 and D=512 bits). Assume the host signal is a 16 bits audio, concatenating all the high bits (all the bits except the least significant bit) of the 512 samples yields a message Mb of 15×512=7680 bits. By further concatenating a key of 512 bits (or a key of shorter length which is padded to 512 bits (or a key of shorter length which is padded to 512 bits), a message MB of 8192 bits is produced.

Computer the one way hash with the MD5 algorithm, MB'=h=H(MB) to generate a 128 bit message MB'. (Append time or other secondary hidden data, such as the error correction bits, host signal length, and/or owner information, if B>128 bits.)

Use public key (or secret key, depends on different applications) cryptography method to sign MB' with secret key K creating MB"=Sgn(K, MB').

Insert the B bits message, MB", into the least significant bit of each sample, from 1→0 if embedding 0 or 0→1 if embedding 1, into the verification block.

A similar authentication scheme is further discussed in C. W. Wu, D. Coppersmith, F. C. Mintzer, C. P. Tresser, M. M. Yeung, *Fragile Imperceptible Digital Watermark with Privacy Control*, Proc. SPIE'99, vol. 3657.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

What is claimed is:

1. A method for distributing executable code in an electronic media distribution system, the media distribution device having a content providing device and at least one player device, comprising the steps of:

embedding the executable code and error correction data operable to ensure errorless extraction of the executable code into a media sound file host data stream to form an embedded data stream, the executable code being embedded orthogonal to the error correction data in the embedded data stream, thereby avoiding interference between embedded bits and ensuring extractability of the executable code and the error correction data so that errorless extraction of the executable code can be achieved, including embedding the executable code and the error correction data into singular points and maskee points of the host data stream to render the embedded bits imperceptible to a human auditory system, where a singular point, masker point and maskee point are defined as follows:

a singular point I(j) is defined as iff sign (I(j))=−sign(I(j−1)) & sign(I(j))=−sign(I(j+1));

a masker point I(j) is defined as a point with an intensity value larger than a threshold δ, i.e., amp(I(j))>δ;

a maskee point I($j^k$) is defined as a point that is under the mask of a masker point I(j), i.e., amp(I($j^k$))<mask(amp (I(j)));

transferring the embedded data stream from the content providing device to the player device;

extracting the executable code and the error correction data from singular points and maskee points of the embedded data stream on the player device;

using the error correction data to ensure the errorless extractability of the executable code from the embedded data stream; and executing the executable code on the player device when the executable code is extracted without error from the embedded data stream.

2. The method of claim 1 further comprising the steps of embedding authentication data orthogonal to the executable code and error correction data, and authenticating the embedded data stream using the authentication data prior to extracting the executable code.

3. The method of claim 1 further comprising the steps of encrypting the executable code prior to embedding the executable code into the host data signal and decrypting the executable code prior to executing the executable code on the player device.

4. An electronic media distribution system for distributing executable code in a host data stream, the media distribution device having a content providing device and at least one player device, the content provider device comprising:

a bit stream generator receiving executable code and converting the executable code into an active bit stream;

a first encoder receiving the active bit stream and the host data stream and embedding the active bit stream into the host data stream, thereby forming an embedded data stream; and a second encoder receiving error correction data operable to ensure errorless extraction of the active bit stream and the embedded data stream and embedding the error correction data into the embedded data stream, orthogonal to the active bit stream in the embedded data stream; and the at least one player device comprising;

a first decoder receiving the embedded data stream and extracting the error correction data from the embedded data stream;

a second decoder receiving the embedded data stream from the first decoder and extracting the active bit stream;

a correction module receiving the active bit stream and the error correction data, and using the error correction data to ensure errorless extractability of the active bit stream from the embedded data stream; and an initiator for executing the active bit stream on the player device, wherein said first encoder and said second encoder are operable to embed the executable code orthogonally to the error correction data in singular points and maskee points of the host data stream to render the embedded bits imperceptible to a human auditory system, where a singular point, masker point and maskee point are defined as follows:

a singular point $I(j)$ is defined as iff sign $(I(j))=-$sign $(I(j-1))$ & sign$(I(j))=-$sign$(I(j+1))$;

a masker point $I(j)$ is defined as a point with an intensity value larger than a threshold $\delta$, i.e., amp$(I(j))>\delta$;

a maskee point $(I(j^k)$ is defined as a point that is under the mask of a masker point $I(j)$, i.e. amp$(I(j^k))<$mask $($amp$(I(j)))$; and wherein said first decoder and said second decoder are operable to extract the active bit stream and the error correction data from the singular points and maskee points of the host data stream.

* * * * *

UNITED STATES PATENT AND TRADEMARK OFFICE
CERTIFICATE OF CORRECTION

PATENT NO. : 6,850,910 B1
APPLICATION NO. : 09/425592
DATED : February 1, 2005
INVENTOR(S) : Yu et al.

It is certified that error appears in the above-identified patent and that said Letters Patent is hereby corrected as shown below:

On the title page item (57), lines 3 and 4, "includes" should be --comprises--

Signed and Sealed this

Eighteenth Day of March, 2008

JON W. DUDAS
*Director of the United States Patent and Trademark Office*